(12) United States Patent
Gordon et al.

(10) Patent No.: US 8,126,841 B2
(45) Date of Patent: Feb. 28, 2012

(54) STORAGE AND RETRIEVAL OF VARIABLE DATA

(75) Inventors: Justin Harding Gordon, San Francisco, CA (US); Patrice Pominville, Brisbane, CA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/034,475

(22) Filed: Feb. 20, 2008

(65) Prior Publication Data

US 2009/0210434 A1 Aug. 20, 2009

(51) Int. Cl.
*G06F 7/00* (2006.01)
*G06F 17/00* (2006.01)

(52) U.S. Cl. .................. 707/609; 707/610; 707/624

(58) Field of Classification Search .................. None
See application file for complete search history.

(56) References Cited

U.S. PATENT DOCUMENTS

| | | | |
|---|---|---|---|
| 5,504,885 A | 4/1996 | Alashqur | |
| 5,633,923 A * | 5/1997 | Kovarik | 379/267 |
| 5,752,028 A | 5/1998 | Ellacott | |
| 6,290,444 B1 | 3/2003 | Lee | |
| 6,925,474 B2 * | 8/2005 | McGrath et al. | 1/1 |
| 7,051,042 B2 | 5/2006 | Krishnaprasad et al. | |
| 7,207,002 B2 | 4/2007 | Mireku | |
| 7,620,652 B2 * | 11/2009 | Zhang et al. | 1/1 |
| 2002/0107840 A1 | 8/2002 | Rishe | |
| 2004/0039964 A1 | 2/2004 | Russell et al. | |
| 2004/0193575 A1 | 9/2004 | Chen et al. | |
| 2005/0091231 A1 | 4/2005 | Pal et al. | |
| 2005/0144622 A1 | 6/2005 | Ballinger et al. | |
| 2005/0228765 A1 * | 10/2005 | Huang et al. | 707/1 |
| 2006/0036935 A1 | 2/2006 | Warner et al. | |
| 2006/0047679 A1 | 3/2006 | Purdy et al. | |
| 2006/0167902 A1 | 7/2006 | Bhattacharyay et al. | |
| 2006/0168513 A1 | 7/2006 | Coulson et al. | |
| 2007/0061779 A1 | 3/2007 | Dowedeit et al. | |
| 2009/0055445 A1 * | 2/2009 | Liu et al. | 707/203 |

OTHER PUBLICATIONS

Kangasharju, J.; Tarkoma, S. "Benefits of Alternate XML Serialization Formats in Scientific Computing". Jun. 25-25, 2007. Proceedings of the 2007 workshop on Service-oriented computing performance: aspects, issues, and approaches. ACM. Monterey, California, USA.
Kangasharju, J.; Tarkoma, S.; Lindholm, T. "Xebu: A Binary Format with Schema-Based Optimizations for XML Data." Oct. 24, 2005. pp. 528-535, Lecture Notes in Computer Science, Springer Berlin / Heidelberg, Germany.
Brutzman, D.; McGregor, D.; Hudson, A. "XML Binary Serialization Using Cross-Format Schema Protocol (XFSP) and XML Compression Considerations for Extensible 3D (X3D) Graphics". Sep. 28, 2003. The W3C Workshop on Binary Interchange of XML Information Item Sets. Santa Clara, California, USA. "W3C: XQuery 1.0: An XML Query Language", W3C Candidate Recommendation, Nov. 3, 2005, pp. 1-225, retrieved Apr. 17, 2006 from http://www.w3.org/TR/xquery/.

* cited by examiner

*Primary Examiner* — Jay Morrison
(74) *Attorney, Agent, or Firm* — Mollborn Patents, Inc.; Fredrick Mollborn

(57) ABSTRACT

Methods and apparatus, including computer program products, implementing and using techniques for managing data items. A data store includes at least two copies of each data item. Each copy of a data item is used for a unique set of operations performed on the data item. An application programming interface receives a request from a consumer to perform an operation on a data item in the data store. The application programming interface selects, based on the received request, which copy of the data item is to be used when performing the operation.

22 Claims, 2 Drawing Sheets

STORAGE AND RETRIEVAL OF VARIABLE DATA

BACKGROUND

This invention relates to techniques for managing master data. Master Data Management (MDM) focuses on managing and interlinking reference data, also referred to as Master Data, which is shared by different systems and used by different groups within an organization. Some examples of Master Data include data about clients and customers, products, employees, inventory, suppliers, analytics and so on.

An important consideration when creating an MDM system is how dynamic and variable data is stored in the system. For example, product information is an example of dynamic and variable data that is conceptually represented as a hierarchical document. These hierarchical documents vary by product categories, and do typically not fit inside a traditional database schema. For example, the product attributes for a laptop computer vary greatly from the product attributes on a jet airplane or a loaf of bread.

A key issue in MDM applications, regardless of how the data is stored, is to achieve a high level of performance with the dynamic and variable data, as required by the largest retailers and suppliers that are common users of MDM systems. At the same time, however, the MDM systems must also have the ability to use standard technologies for searching and for creating views of the data.

One technique for storing dynamic and variable data, such as product data, is to store the data in a vertical table format, where the database rows contains item id, attribute id, value, and so on. This technique, however, requires many database rows and much server memory to reconstruct the tree of data.

Another technique involves storing the data in an XML (Extensible Markup Language) format only. A problem with this technique is that it is often considered to be too slow in loading the data from the database. The DOM (Document Object Model) processing of XML documents also uses a large amount of memory and CPU resources. For example, a large amount of computational work is needed to update an attribute in a document, or for validation.

Yet another technique involves storing the dynamic and variable data using a proprietary binary format technology. Representing data in a binary format provides quick and easy memory access, but does neither lend itself very well to searching on the data nor to creating views of the data. It would be desirable to have improved mechanisms for storing and retrieving dynamic and variable data.

SUMMARY

In one aspect, the invention provides methods and apparatus, including computer program products, implementing and using techniques for managing several data items. A data store includes at least two copies of each data item. Each copy of a data item is used for a unique set of operations performed on the data item. An application programming interface receives a request from a consumer to perform an operation on a data item in the data store. The application programming interface selects, based on the received request, which copy of the data item is to be used when performing the operation.

The invention can be implemented to include one or more of the following advantages. By using a binary format, and thus avoiding heavyweight XML processing, superior time and space performance is achieved, compared to conventional solutions. At the same time the benefits of only storing the data in XML format are maintained, including XML retrieval and searching. This allows other systems generic access to stored product data for functionality such as reporting.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various implementations of the invention described herein pertain to efficient storage and retrieval of dynamic and variable data in systems, such as MDM systems. In particular, a combination of binary formats and XML formats is used. In accordance with one implementation, tasks such as reading, writing, and general runtime processing of individual records use data represented in a binary format, and after the binary representation of the record is saved in the database, a configurable synchronous or asynchronous process converts the binary representation into a queryable XML format for storage as XML data in the database. As a consequence, superior speed and memory performance is achieved compared to conventional solutions for various purposes. For example, reports may be able to simply query the XML. Updates to the data need only go to the binary format. At the same time the benefits of only storing the data in XML format are maintained, including XML retrieval and searching features. Various implementations of the invention will now be described by way of example and with reference to the drawings. It should be noted that although the examples below refer to storage of product data objects, the concepts described herein are applicable to any type of generic variable data. That is, the storage and retrieval mechanisms apply to any dynamic and variable data that is modeled in a tree like structure.

Figure 1:
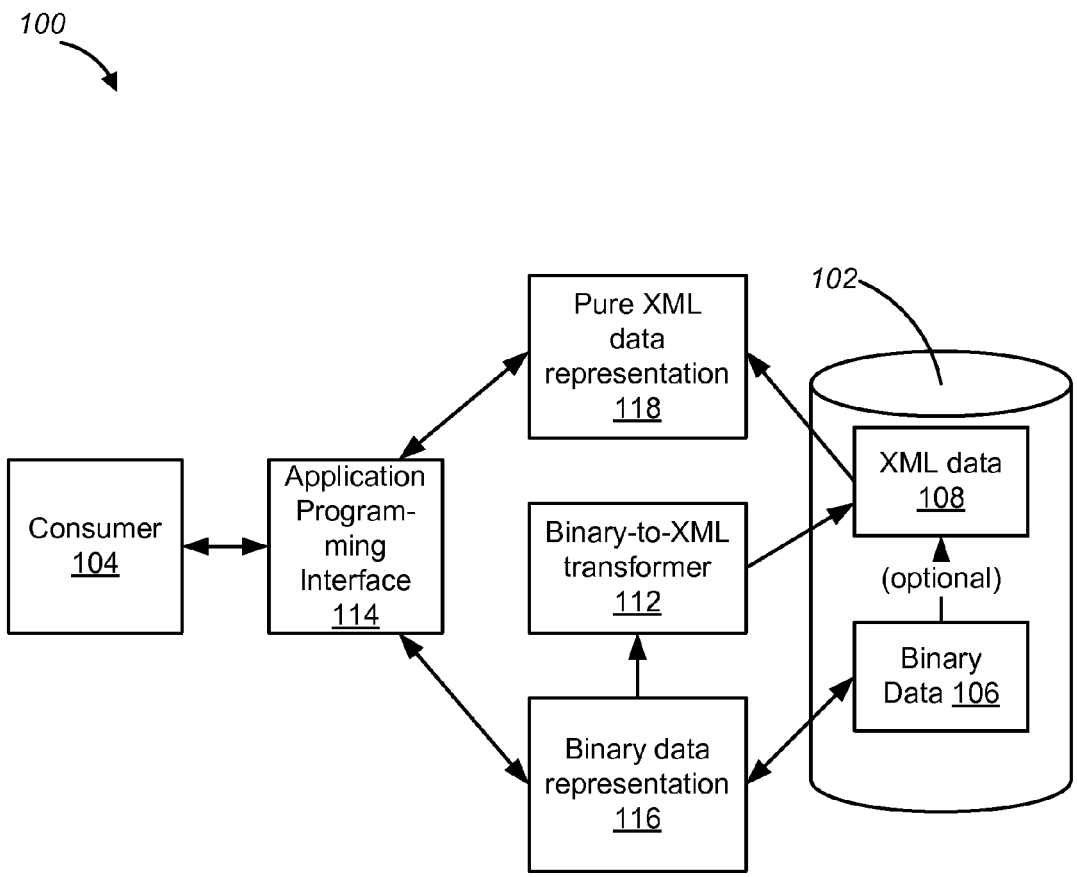
FIG. 1 shows a schematic overview of a system (100) in which the data storage techniques can be implemented, in accordance with one embodiment of the invention.

FIG. 1 shows a schematic overview of a system (100) in which the data storage techniques can be implemented, in accordance with one embodiment of the invention. As shown in FIG. 1, the system (100) includes a database (102) that contains dynamic and variable data, such as product data, which is accessible to consumers (104), which can include, for example, web services, JAVA™ Server Pages (JSPs), batch processing jobs, and other types of various clients programs. The consumers (104) are typically either interested in viewing various aspects of the data, or performing operations on the data, such as reading, adding, updating, searching and saving various portions of the data. It should be noted that although only a single consumer (104) is shown in FIG. 1, there are typically numerous consumers in a conventional system (100).

The database (102) contains two alternate representations of each document or item in the database; a binary representation (106) and an XML representation (108). The binary representation can be implemented in any format that will make reading and writing the data as efficient as possible. The specifics of what binary implementation to use will depend on the data to be stored, as well as the usage characteristics of the data. For example, the data could be stored in some form of fixed length field format such that the positions of the data fields within the record are stored externally to minimize the need to scan the data byte by byte. As the skilled person realizes, there are many variations to the above examples of binary representations and XML representations of data, which can be realized by those of ordinary skill in the art. Such variations are also intended to fall within the scope of the appended claims.

A binary-to-XML transformer (112) (hereinafter referred to as "transformer (112)") is also provided. The transformer (112) converts an in-memory representation (116) of the binary data (106) into corresponding XML data (108) whenever changes are made to the binary data representation (116). This conversion may be done synchronously or asynchronously depending on the program needs. In some implementations, the conversion can be done within the database (102) after the in-memory representation of the binary data (116) has been saved as binary data (106) in the database (102), for example, in a batch-mode type of operation.

In one implementation, the transformer (112) uses a configurable synchronous or asynchronous process to convert the binary data (106) into queryable XML data (108). In one implementation the process works as follows. The transformer reads the data stored in the binary format and steps through each attribute, creating an XML node for each attribute. The XML format can be any transformation needed, but a generic transformation simply maps the product information fields into XML. For example, product information could look like:

```
<product>
  <id> 121</id>
  <attributes>
  <generic attributes>
  <brand>Lenovo</brand>
  <name> Thinkpad T60p</name>
  </generic attributes>
  <product specific attributes>
  <hard drive size> 80 gigs </hard drive size>
  <memory> 2 gigs </memory>
  <product specific attributes>
  </attributes>
</product>
```

As the skilled person realizes, there are many variations to the above examples of conversion processes, since the structure of the binary data may be different in different implementations. Such variations of the above process can be realized by those of ordinary skill in the art, and are intended to fall within the scope of the appended claims.

To access the information in the database (102), the consumers (104) communicate with the database (102) through an Application Programming Interface (API) (114). The API (114) receives a request from the consumer (104), and based on the type of request, the API (114) performs the tasks requested by the consumer, either on a binary data representation (116), as was discussed above, or on a pure XML data representation (118). Additionally, in some implementations, the consumers (104) can access the database (102) directly to read the XML data. Various limitations can also be imposed in some implementations, for example, so that the consumers (104) are not allowed to update the XML data in the database (102) directly.

In accordance with one implementation, tasks such as reading, writing, and general runtime processing of individual records use the binary data representation (116). One of the reasons for using the binary format for these types of operations is that data can be moved more efficiently from disk to memory and back to disk, which significantly decreases the CPU and memory resources needed for these operations. On the other hand, tasks such as searching data and creating views of the data, which typically involve operations on a set of records, use the XML data representation (118).

As was discussed above, whenever any updates are made to the binary data representation (116) and the binary data (106) is saved, the transformer (112) converts the binary data (106) into queryable XML data (108) for storage in the database (102). In one implementation, this conversion process is synchronous and is part of a save process. In another implementation, the process is asynchronous and the save process can post a message that a data item's XML copy of the binary data needs to be updated. Optionally, in the case of asynchronous processing, the pending messages of what XML records need to be updated can be used to improve the accuracy of any returned data. In essence, the XML data (108) works as a "shadow copy" of the binary data (106), and this "shadow copy" can be used for specific read tasks. From the consumer's (104) point of view, all of the above operations are fully transparent. That is, the consumer (104) of the APIs and/or the XML may not know or care that there is a copy of the data in the binary format.

Figure 2:
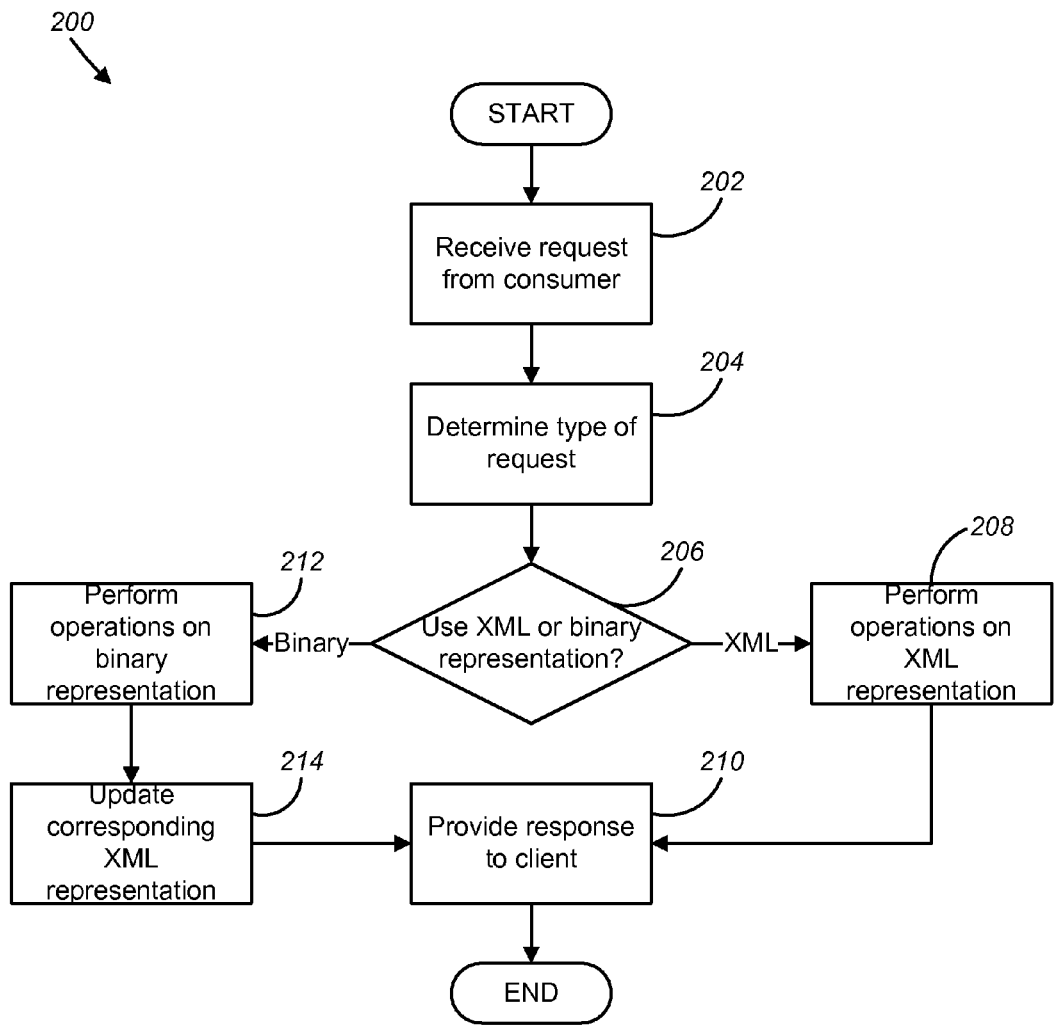
FIG. 2 is a flowchart showing a process (200) for processing a user request in accordance with one implementation of the invention.

FIG. 2 is a flowchart showing a process (200) for processing a user request in accordance with one implementation of the invention. As can be seen in FIG. 2, the process (200) starts by a request being received from a consumer (step 202). The request can be, for example, a request to viewing certain parameters for a data item, such as a product, or a request to perform one or more operations on the data, such as adding product parameters, updating prices, searching for a particular item number, and so on.

The process then determines the type of request (step 204), and whether the request is handled best by using an XML or binary representation (step 206). If it is determined that an XML operation is best suited for the request, then the request is performed using the XML representation of the data (step 206). Typically, such requests involve searching data or creating various views of the data in the database (102). Finally, the response to the request is provided to the consumer (step 210) and the process (200) ends.

If it is determined in step 206 that a binary representation is best suited for the request, then the request is performed using the binary representation of the data (step 212). Typically, such requests involve changes to the data, such as adding, deleting, updating various parameters. After the changes have been made, the process updates (synchronously or asynchronously) the corresponding XML representation (step 214), as was described above. The result is then provided to the consumer (step 210), and the process (200) ends. It should also be noted that in some implementations, the result can be provided to the consumer (104) before the XML representation is updated, that is, in these implementations, steps 210 and 214 occur in the opposite order.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, while reference has been made above to XML and binary representations, it should be clear that any other type of data format that is suitable for creating views and performing searches can also be used. Accordingly, other embodiments are within the scope of the following claims.

The invention claimed is:

1. A master data management system for managing a plurality of data items, comprising:
   a data store storing master data representing dynamic and variable data items, the data store including at least two concurrently stored copies of each data item in a homogeneous database, wherein each copy of a data item is operable to be used for a unique set of operations performed on the data item;
   an application programming interface operable to:
      receive a request from a consumer to perform an operation on a data item in the data store; and
      select, based on the received request, which copy of the at least two copies of the data item is to be used when performing the operation;
   and
   a data item transformer that is operable to:
      detect whether a change is made to a copy of a data item; and
      in response to detecting that a change has been made to a copy of a data item, update at least one other copy of the data item to reflect the change.

2. The system of claim 1, wherein the application programming interface is further operable to perform the received operation on the selected copy of the data item.

3. The system of claim 1, wherein the at least two copies of each data item include: a first copy of the data item in a binary format, and a second copy of the data item in an extensible markup language format.

4. The system of claim 3, wherein the binary format is used for operations including one or more of: reading, writing and general runtime processing of individual data items.

5. The system of claim 3, wherein the extensible markup language format is used for operations including one or more of: retrieving, searching and creating views of sets of data items.

6. The system of claim 3, wherein the data item transformer is a binary-to-XML transformer that is operable to:
   detect whether a change is made to the first or the second copy of the data item;
   in response to detecting that a change has been made to the first copy of the data item, update the second copy of the data item to reflect the change; and
   in response to detecting that a change has been made to the second copy of the data item, update the first copy of the data item to reflect the change.

7. The system of claim 1, wherein the request from the consumer is received from one of: a client program application and a web service.

8. The system of claim 1, wherein the system is a product information management system and the plurality of data items represent information about individual products.

9. A computer-implemented method in a master data management system for performing an operation on a data item in a data store, the method comprising:
   storing master data for at least two concurrently stored copies of the data item in a homogeneous database in the data store, the data item representing dynamic and variable data, wherein each copy of the data item is operable to be used for a unique set of operations performed on the data item;
   receiving a request from a consumer to perform an operation on the data item;
   selecting, based on the received request, one of the at least two copies of the data item to use when performing the operation;
   detecting whether a change is made to a copy of a data item; and
   in response to detecting that a change has been made to a copy of a data item, updating at least one other copy of the data item to reflect the change.

10. The method of claim 9, further comprising:
    performing the received operation on the selected copy of the data item.

11. The method of claim 9, wherein the at least two copies of each data item include: a first copy of the data item in a binary format, and a second copy of the data item in an extensible markup language format.

12. The method of claim 11, wherein selecting one of the at least two copies includes:
    selecting the binary format of the data item for operations including one or more of: reading, writing, and general runtime processing of the data item.

13. The method of claim 11, wherein selecting one of the at least two copies includes:
    selecting the extensible markup language format of the data item for operations including one or more of: retrieving, searching and creating views of sets of data items.

14. The method of claim 9, wherein receiving a request includes receiving a request from one of: a client program application a web service.

15. The method of claim 9, wherein the data item represents information about a product in a product information management system.

16. A computer program product comprising a computer useable tangible storage medium including a computer readable program, wherein the computer readable program when executed on a computer causes the computer to:
   store master data for at least two concurrently stored copies of the data item in a homogeneous database in the data store that is part of a master data management system, the data item representing dynamic and variable data, wherein each copy of the data item is operable to be used for a unique set of operations performed on the data item;
   receive a request from a consumer to perform an operation on the data item;
   select, based on the received request, one of the at least two copies of the data item to use when performing the operation;
   detect whether a change is made to a copy of a data item; and
   in response to detecting that a change has been made to a copy of a data item, update at least one other copy of the data item to reflect the change.

17. The computer program product of claim 16, wherein the computer readable program when executed on a computer further causes the computer to perform the received operation on the selected copy of the data item.

18. The computer program product of claim 16, wherein the at least two copies of each data item include: a first copy of the data item in a binary format, and a second copy of the data item in an extensible markup language format.

19. The computer program product of claim 18, wherein selecting one of the at least two copies includes:
   selecting the binary format of the data item for operations including one or more of: reading, writing, and general runtime processing of the data item.

20. The computer program product of claim 18, wherein selecting one of the at least two copies includes:
   selecting the extensible markup language format of the data item for operations including one or more of: retrieving, searching and creating views of sets of data items.

21. The computer program product of claim 16, wherein receiving a request includes receiving a request from one of: a client program application a web service.

22. The computer program product of claim 16, wherein the data item represents information about a product in a product information management system.

* * * * *